US005674626A

United States Patent [19]

Khatib et al.

[11] Patent Number: 5,674,626

[45] Date of Patent: Oct. 7, 1997

[54] RELEASE COMPOSITION FOR PRINTABLE LINERLESS LABELS

[75] Inventors: Khaled Khatib, Youngstown; Joseph W. Langan, Cheekatowaga, both of N.Y.

[73] Assignee: Moore Business Forms, Inc., Grand Islnnd, N.Y.

[21] Appl. No.: 666,825

[22] Filed: Jun. 19, 1996

[51] Int. Cl.[6] .................... B32B 9/04

[52] U.S. Cl. .................... 428/447; 428/345; 428/352; 522/99

[58] Field of Search .................... 428/447, 345, 428/352; 522/99

[56] References Cited

U.S. PATENT DOCUMENTS

| | | | |
|---|---|---|---|
| 3,051,588 | 8/1962 | Lavanchy | 117/68.5 |
| 3,285,771 | 11/1966 | Dabroski | 117/68.5 |
| 3,878,263 | 4/1975 | Martin | 260/825 |
| 4,201,808 | 5/1980 | Cully et al. | 428/40 |
| 4,503,208 | 3/1985 | Lin et al. | 528/15 |
| 4,585,669 | 4/1986 | Eckberg | 427/54.1 |
| 4,678,846 | 7/1987 | Weitemeyer et al. | 525/477 |
| 4,851,383 | 7/1989 | Fickenscher et al. | 503/200 |
| 4,908,274 | 3/1990 | Jachmann et al. | 428/452 |
| 4,911,986 | 3/1990 | Keryk et al. | 428/447 |
| 5,039,761 | 8/1991 | Ono et al. | 525/479 |
| 5,354,588 | 10/1994 | Mitchell et al. | 428/40 |
| 5,518,762 | 5/1996 | Soltysiak et al. | 427/208 |

FOREIGN PATENT DOCUMENTS 1248412 1/1989 Canada.

*Primary Examiner*—Margaret W. Glass
*Attorney, Agent, or Firm*—Finnegan, Henderson, Farabow, Garrett & Dunner

[57] ABSTRACT

Linerless label stock is produced from a single substrate utilizing a coating machine by moving the substrate through the coating machine and applying a tie coating to the substrate first face, a release coating to the substrate second face, and a pressure sensitive adhesive to the tie coating. The release coating comprises a mixture of (a) about 55 to about 95 parts by weight of a first acrylated polysiloxane having the formula I:

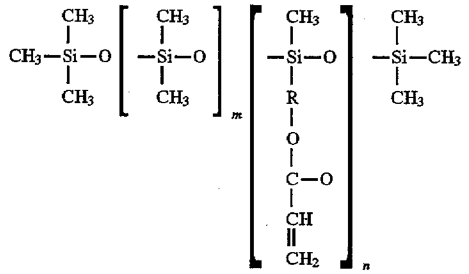

(I)

wherein R is a $C_4$–$C_2$ alkyl group, m is about 40 and n ranges from about 8 to about 12;

b) about 5 to about 45 parts by weight of a second acrylated polysiloxane having the formula II:

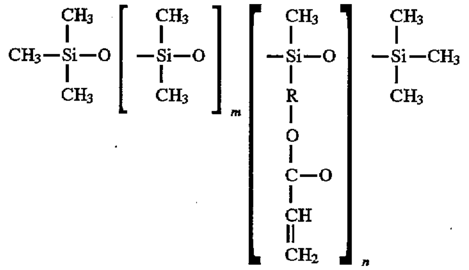

(II)

wherein R is a $C_4$–$C_{12}$ alkyl group, m is about 180 and n ranges from about 8 to about 12; and c) about 2 to about 6 parts by weight of a photoinitiator.

12 Claims, 2 Drawing Sheets

RELEASE COMPOSITION FOR PRINTABLE LINERLESS LABELS

BACKGROUND OF THE INVENTION

1. Field of the Invention

This invention relates to linerless labels and, in particular, to linerless labels having pressure sensitive adhesive and release coatings.

2. Description of Related Art

Linerless labels, such as shown in U.S. Pat. Nos. 3,051,588, 3,285,771, and 4,851,383, and in Canadian Patent No. 1,248,412, are known to have advantages over conventional pressure sensitive labels that are mounted on a separate liner having a release coating. In conventional labels, the liner acts as a support for transport, printing and storage, and is discarded after the label is removed from the liner. In contrast, a linerless label has a face surface that is coated with a release coating and a back surface that is coated with a pressure sensitive adhesive (PSA). A strip of linerless labels may be wound in a roll configuration so that the PSA on the back side of the strip is in contact with the release coating on the face side of the strip, where the release coating faces outwardly. The adhesion between the PSA and release coating holds the strip in a roll. Labels can be peeled off individually from the roll of linerless labels, without having a liner web to tear off and discard each time a label is used.

Because a liner web is not needed in a roll of linerless labels, certain advantages and cost savings are realized, including substantial material reduction due to the lack of a liner, elimination of the disposable liner and costs associated with release coated liners, and space savings in that a roll of linerless labels can have about twice as many labels as a same size roll of labels with liners. Despite these advantages, linerless labels have not enjoyed widespread commercial acceptance. The lack of acceptance is perhaps due in part to impediments to easy and clean peeling of the PSA from the release coating in the roll format. For example, if the adhesion between the PSA and the label substrate is weak or becomes weak (adhesion strength degrades over time under some environmental conditions and with some materials), then the PSA adhesive may stick to the release coating instead of the label as is intended, or the substrate may be torn when the labels are peeled off the label roll.

Silicone release coatings have been proposed for use with linerless labels. It has been found, however, that while certain silicone release compositions provide adequate release properties for pressure sensitive adhesives, it is difficult to print on such coatings due to the low surface energy of silicone coated substrates.

Thus, the need exists for a release coating composition that provides adequate release properties for pressure sensitive adhesives, and also allows ink to transfer to the release surface, particularly for thermal transfer printing.

The present invention satisfies that need by providing a release composition and a linerless label incorporating that release composition that provide excellent release properties for a pressure sensitive adhesive while also providing good anchorage of ink to the release surface.

SUMMARY OF THE INVENTION

To achieve these and other advantages, and in accordance with the purpose of the invention as embodied and broadly described herein, the present invention provides a release composition. The composition comprises a mixture of (a) about 55 to about 95 parts by weight of a first acrylated polysiloxane having the formula I:

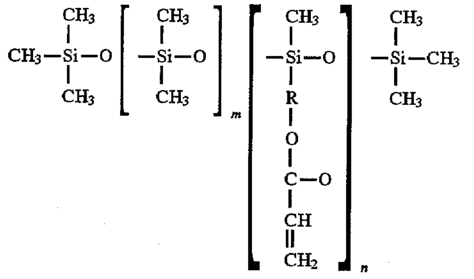

(I)

wherein R is a $C_4$–$C_{12}$ alkyl group, m is about 40 and n ranges from about 8 to about 12; (b) about 5 to about 45 parts by weight of a second acrylated polysiloxane having the formula II:

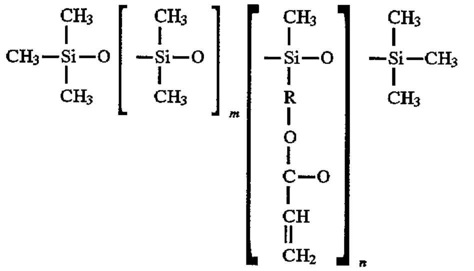

(II)

wherein R is a $C_4$–$C_{12}$ alkyl group, m is about 180 and n ranges from about 8 to about 12; and (c) about 2 to about 6 parts by weight of a photoinitiator.

The release composition of the invention is particularly useful in a linerless label, and even more particularly in a thermal transfer linerless label.

Although the preferred embodiment of the release composition of the invention is in a linerless label, the invention as broadly claimed is not so limited and its benefits and advantages apply equally to other applications for which releases are used. The above and other advantages and features of this invention will become apparent upon review of the following specification in conjunction with the drawings.

DETAILED DESCRIPTION OF THE PREFERRED EMBODIMENTS

Figure 1:
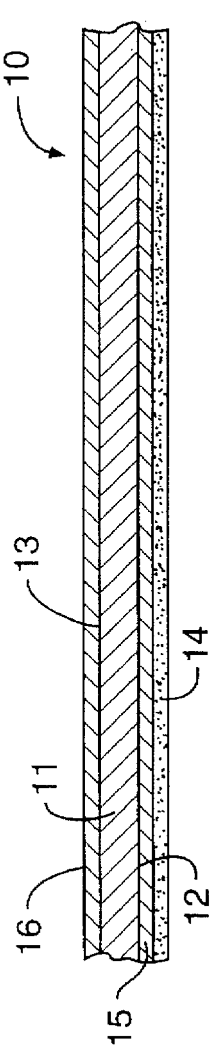
FIG. 1 is a cross-sectional view of exemplary linerless label stock according to the present invention showing each of the layers (with greatly exaggerated thickness)

In accordance with the invention, an exemplary section of linerless label stock is shown generally by reference numeral 10 in FIG. 1. The stock 10 according to the invention comprises a substrate 11 having a first face 12 and a second face 13. The substrate may be any conventional substrate used in label applications, such as bond paper, latex-impregnated paper, vinyl, or polyester. The substrate can also be a thermally-sensitive one. The substrate preferably has a moisture content of from 0 to 10%, more preferably of from 0 to 4%.

Associated with substrate 11 is a coating of pressure sensitive adhesive (PSA) 14. The PSA may comprise any conventional formulation used in pressure sensitive adhesive applications, including solvent-based, water-based, hot melt, acrylic emulsions, rubber-based, latex or radiation curable formulations. Typical adhesive formulations are listed in the "Handbook of Pressure-Sensitive Technology" by Donatas Satas, Van Nostrand Reinhold Company, 1983. One particularly desirable PSA comprises a water-based acrylic adhesive prepared by free radical polymerization of acrylic monomers (either a homopolymer or a copolymer). For example, the polymer may be made of about 70–100% of a soft monomer such as 2-ethylhexyl acrylate, about 0–6% of a functional monomer such as acrylic acid, and about 0 to 30% of a hard monomer such as vinyl acetate, which polymer has repositionable properties, but other polymers having properties found in removable or permanent adhesives may also be used. In addition, the PSA may be patterned to provide areas of the substrate, such as edges, that are free of adhesive to ease removal of the label from the roll or a surface, or to provide areas of relative adhesive weakness.

Adherence of the PSA 14 to the substrate 11 first face 12 may be provided by, for example, a tie coating 15. The tie coating 15 adheres to both the PSA and substrate 11. It may comprise, or consist essentially of, a dispersion of a pigment, preferably silica, with a binder material, such as polyvinyl alcohol (PVA), polyvinyl acetate, hydroxyethyl cellulose, and the like. For example, the tie coating may comprise or consist essentially of about 30–40 parts silica dispersion, about 20–35 parts PVA, and about 30–40 parts water.

In accordance with the present invention, on the second face 13 of substrate 11, which may have printing thereon (see FIG. 4), a release coating 16 is provided. The release coating 16 comprises a mixture of (a) about 55 to about 95 parts by weight of a first acrylated polysiloxane having the formula I:

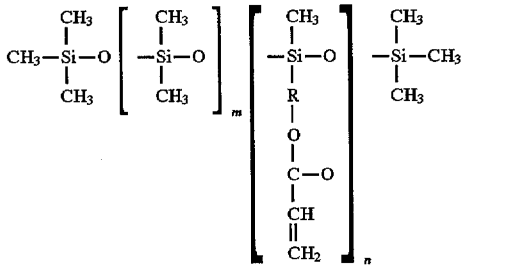

(I)

wherein R is a $C_4$–$C_{12}$ alkyl group, m is about 40 and n ranges from about 8 to about 12; (b) about 5 to about 45 parts by weight of a second acrylated polysiloxane having the formula II:

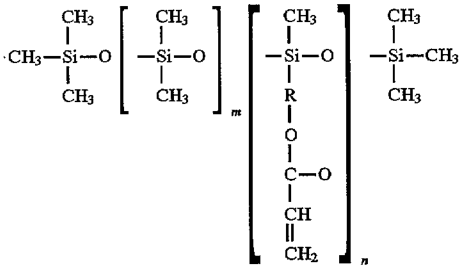

(II)

wherein R is a $C_4$–$C_{12}$ alkyl group, m is about 180 and n ranges from about 8 to about 12; and (c) about 2 to about 6 parts by weight of a photoinitiator. The release coating is applied to the substrate in a coating weight preferably ranging from about 0.35 to about 0.45 lb./ream (17×22/500).

Figure 2:
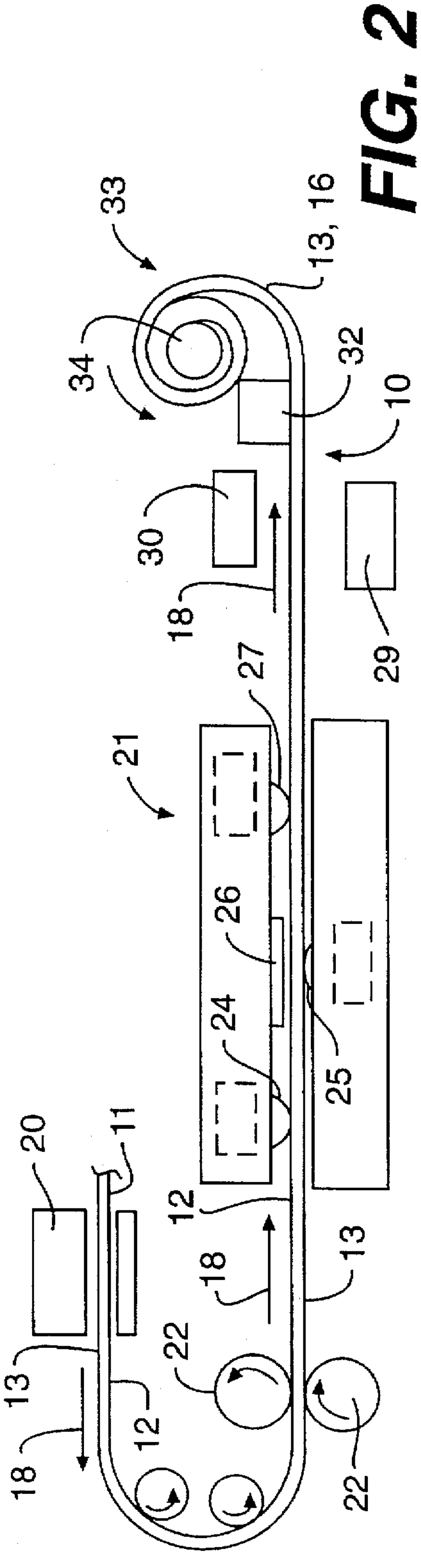
FIGS. 2 and 3 are side schematic views showing exemplary apparatuses for practicing an exemplary method of producing linerless labels according to the present invention.

FIG. 2 illustrates an exemplary apparatus for producing linerless labels according to an exemplary method of the present invention. Substrate 11 is continuously moved in the direction of arrows 18. Printing may be applied to the second face 13, as with the conventional printer 20, which may be located prior to a coating machine 21, and drives for the substrate 11 may be any conventional driving means, such as drive rollers 22. Alternatively, printer 20 may be located after a dryer 26 but before the second applicator 27, described below.

In the single, conventional coating machine 21, all three of the coatings 14–16 are provided. For example, a first roller or like applicator 24 applies tie coating 15 to first face 12, while shortly thereafter a second roller or applicator 25 applies release coating 16 to second face 13. A dryer 26 is also provided for effecting drying of tie coating 15 much more quickly than by ambient air (e.g., a hot air dryer) so that the tie coat is dry by the time it reaches the third roller or other applicator 27, which applies pressure sensitive adhesive 14 over tie coat 15, on face 12.

Drying of PSA 14 and/or release coating 16 may be effected by dryers 29, 30 downstream of coating machine 21 in the direction of arrows 18. Dryers 29, 30 effect drying much more quickly than ambient air, and may be hot air, infrared, or like conventional dryers depending upon the particular coatings. After stock 10 is dried, it is cut into labels by a conventional cutter 32. Then stock 10 is taken up in roll format 33 by take up mechanism 34, with release coating 16 and second face 13 on the outside of the roll 33 that is being taken up, and PSA 14 in contact with release coating 16 in the spiral configuration of roll 33. The labels can be formed from a web which, just prior to take up 34, is slit into rolls 33, or rolls 33 can be formed later, after take up.

Figure 3:
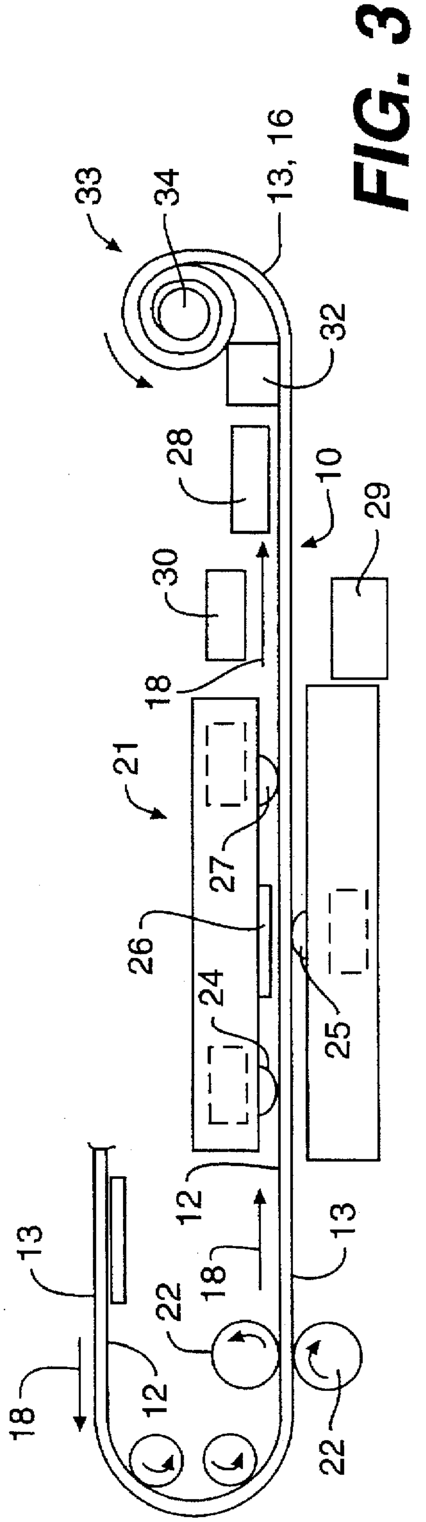

Alternatively, a non-impact printer 28 may be located after coating machine 21, as is shown in FIG. 3. By locating the printer as shown in FIG. 3, the printer prints its image on top of the release coating or the adhesive coating. While an impact printer may be used to print an image directly on the substrate, as is shown in FIG. 2, it is suggested that a non-impact printer, e.g., an ink-jet, ion deposition or laser printer such as made by Midax®, Xeikon®, and Indigo®, be used to print an image, i.e., black and white or color, on the substrate coatings. Moreover, printer 28 can be in-line with the coating machine so that the coating and printing steps can be accomplished in the same manufacturing line. With respect to images printed on the PSA after the coating machine, the printer should have release coated surfaces juxtaposed to the label stock to prevent adhesion between the PSA of the label stock and the printer.

In accordance with the invention, the release coating of the invention allows for printing to be performed on release coating 16 (e.g., a hot melt ink, ink jet printer.) The present inventors have found that the particular release composition of the invention provides an optimum combination of release properties and receptivity to printing ink. The composition comprises a mixture of (a) about 55 to about 95 parts by weight of a first acrylated polysiloxane having the formula I:

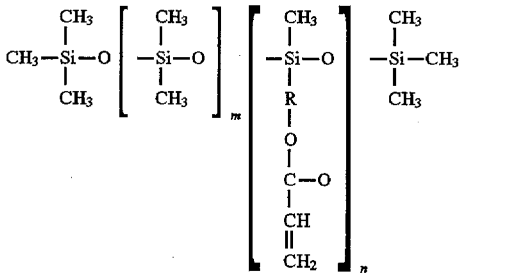

(I)

wherein R is a $C_4$–$C_{12}$ alkyl group, m is about 40 and n ranges from about 8 to about 12; (b) about 5 to about 45 parts by weight of a second acrylated polysiloxane having the formula II:

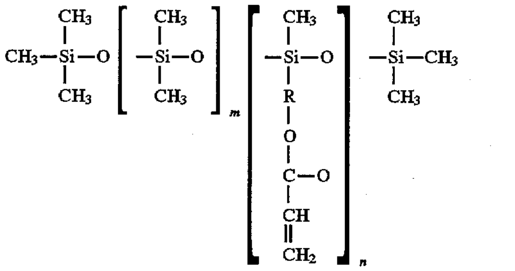

(II)

wherein R is a $C_4$–$C_{12}$ alkyl group, m is about 180 and n ranges from about 8 to about 12; and (c) about 2 to a parts by weight of a photoinitialtor. The acrylate units in each of the polysiloxane compounds are randomly distributed throughout the polymer.

The acrylated polysiloxane of (a) is a relatively short chain polymer with high functionality. This material serves as a "tight" release and, because of its high density inter- and intrachain crosslinking, provides enhanced anchorage to the substrate. This composition is available from Goldschmidt Chemical Corp. of Hopewell, Va. under the trade name TEGO® Silicone Acrylate RC 711. The acrylated polysiloxane of (b) has a relatively high molecular weight and provides excellent release properties. This composition is also available from Goldschmidt Chemical Corp. of Hopewell, Va., under the trade name TEGO® Silicone Acrylate RC 726.

In accordance with the invention, by varying the ratio of acrylated polysiloxane (a) to acrylated polysiloxane (b) present in the release composition, the desired release properties can be obtained. For example, if relatively greater anchorage to the substrate is desired, the amount of acrylated polysiloxane (a) is increased relative to acrylated polysiloxane (b). On the other hand, if better release is the desired property, the amount of acrylated polysiloxane (b) is increased relative to acrylated polysiloxane (a). The present inventors have found that a particularly preferred composition is one that contains about 55 to about 95 parts by weight of acrylated polysiloxane (a), and about 5 to about 45 parts by weight of acrylated polysiloxane (b). Such a composition provides both excellent release properties and excellent anchorage of ink to the release surface. RC 711 and RC 726 from Goldschmidt Chemical contain, in addition to the acrylated polysiloxane, a photoinitiator to assist in curing the composition. The particular photoinitiator in RC 711 and RC 726 is Darocur 1173, which is 2-hydroxy-2-methyl-1-phenyl-1-propanone, available from Ciba-Geigy Corp. However, any of those photoinitiators known in the art to be effective in curing polysiloxanes can be used in the invention.

The release composition of the invention can be made, for example, by mixing together the RC 711 and RC 726 in the appropriate ratio, each of which contains the Darocur 1173 photoinitiator. This mixture is then coated onto the desired substrate by any of those means known in the art.

The release composition can be cured after coating on the substrate by exposure to uv radiation in a nitrogen-rich atmosphere in which oxygen is preferably maintained at a concentration less than 50 ppm. If the level of oxygen exceeds 50 ppm, complete curing may not be achieved. UV curing can be carried out by, for example, passing the release coated substrate under an "H" type lamp (available from Fusion Systems, Rockville, Md.) at a rate preferably ranging from about 100 fpm to about 700 fpm, more preferably about 300 fpm, and at a wavelength preferably ranging from about 200 to about 350 nm, more preferably closer to about 350 nm.

Figure 4:
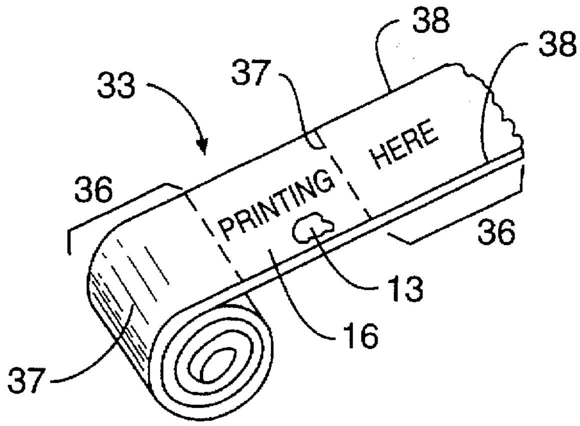
FIGS. 4 to 6 are perspective views of exemplary rolls of linerless label stock of FIG. 1, produced utilizing the apparatuses shown in FIGS. 2 and 3.
Figure 5:
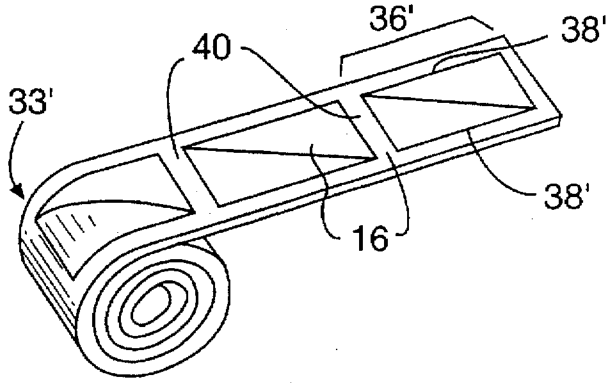
Figure 6:
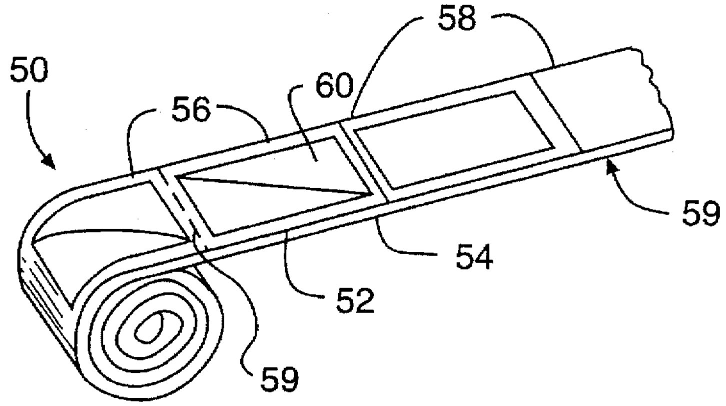

FIGS. 4, 5, and 6 illustrate two different constructions of rolls of linerless label. The roll 33 of FIG. 4 has individual labels 36 which have been cut, with less than complete severing (e.g., by very fine perforations, or die cuts, indicated by cut lines 37 in FIG. 4), generally transverse to the direction of elongation of substrate 11 of roll 33, with the sides 38 of each label corresponding to the sides of substrate 11. Each label 36 has a width and length typically less than one foot. In this construction there is no waste whatsoever but rather each label 36 is merely detached along a line 37 from the next label 36 in sequence.

FIG. 5 illustrates a modified form of a roll 33' of linerless labels according to the invention. In this embodiment, the cutter 32 effects complete die cutting of individual labels 36' out of the substrate, so that the edges 38' thereof do not correspond to the side edges of the substrate. Labels 36' may have any shape (they need not be quadrate), but in this embodiment there is some waste material provided by the skeletal structure 40 of the substrate outside of labels 36'.

Figure 7:
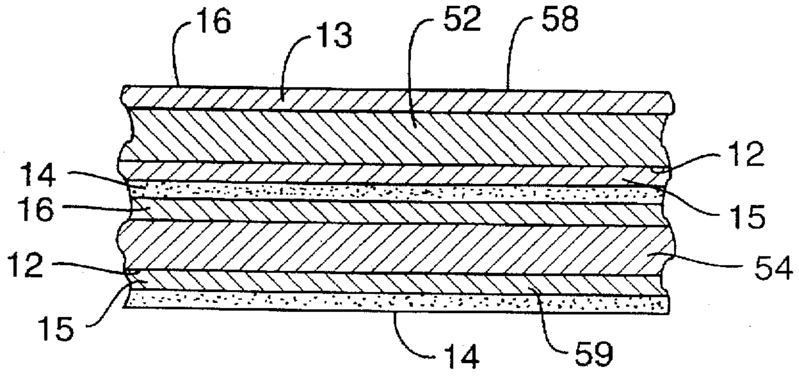
FIG. 7 is a cross-sectional view of the linerless label stock shown in FIG. 6.

FIG. 6 illustrates a further modified form of a roll 50 of linerless labels according to the invention. In this embodiment, roll 50 is formed of two substrate webs 52, 54 of linerless labels that are piggybacked together to provide a roll of two-substrate labels 56. These labels may be separated by a die cut 58 or by a perforated cutter 32. Alternatively, one of the substrates may be die cut 58 and the other substrate perforated 59. Similarly, a sub-label 60 can be die cut from a portion of one of the substrates for each label, As is shown in FIG. 7, the two-substrate label may be formed of first substrate 52 coated on a first (back) face 12 with a tie coating 15 which is in turn coated with a PSA 14, and a second (front) face 13 coated with a release coating 16. Similarly, second substrate 54 is coated on a first (back) face 12 with a tie coating 15 which is in turn coated with a PSA 14, and a second face 13 coated with a release coating 16. The PSA of the first substrate adheres to the release coating of the second substrate to hold the two substrates together as a single label. The user can peel one substrate label from the other substrate label to have a coupon or routing slip having more than one part.

It will be apparent to those skilled in the art that various modifications and variations can be made in the release composition and linerless label of the invention without departing from the spirit or scope of the invention. Thus, it is intended that the present invention cover the modifications and variations of this invention provided that they come within the scope of the appended claims and their equivalents.

What is claimed is:

1. A linerless label comprising:

a substrate having first and second faces;

a pressure sensitive adhesive on said first face of said substrate;

a release coating on at least a portion of said second face of said substrate, said release coating comprising:

(a) about 55 to about 95 parts by weight based upon the total weight of the release coating of a first acrylated polysiloxane having the formula I:

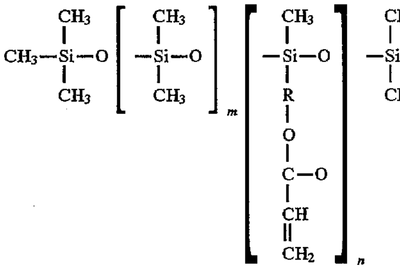

(I)

wherein R is a $C_4$–$C_{12}$ alkyl group, m is about 40 and n ranges from about 8 to about 12;

(b) about 5 to about 45 parts by weight based upon the total weight of the release coating of a second acrylated polysiloxane having the formula II:

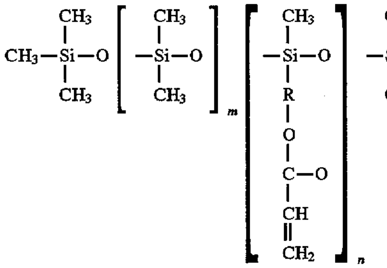

(II)

wherein R is a $C_4$–$C_{12}$ alkyl group, m is about 180 and n ranges from about 8 to about 12; and (c) about 2 to about 6 parts by weight based upon the total weight of the release coating of a photoinitiator.

2. The label of claim 1, further comprising a tie coating juxtaposed between said adhesive and said substrate.

3. The label of claim 2, wherein said tie coating comprises a dispersion of a pigment with a binder.

4. The label of claim 3, wherein said tie coating comprises about 30 –40 parts by weight silica dispersion, about 20–35 parts by weight polyvinyl alcohol, and about 30–40 parts by weight water, based upon the total weight of said tie coating.

5. The label of claim 1, wherein said adhesive is a permanent adhesive.

6. The label of claim 1, wherein said adhesive is a repositionable adhesive.

7. The label of claim 1, wherein said adhesive is a removable adhesive.

8. The label of claim 6, wherein said adhesive comprises about 70–100% by weight based upon the total weight of the adhesive of 2-ethylhexyl acrylate, about 0–6% by weight based upon the total weight of the adhesive of acrylic acid, and about 0 to 30% by weight based upon the total weight of the adhesive of vinyl acetate.

9. The label of claim 1, wherein said substrate is paper.

10. The label of claim 1, wherein said substrate is thermal transfer paper.

11. The label of claim 1, wherein said substrate has a moisture content of from 0 to 10% by weight based upon the total weight of the substrate.

12. The label of claim 11, wherein said substrate has a moisture content of from 0 to 4% by weight based upon the total weight of the substrate.

* * * * *